United States Patent
Huang et al.

(10) Patent No.: US 10,868,289 B2
(45) Date of Patent: Dec. 15, 2020

(54) SEPARATOR, METHOD FOR PREPARING THE SAME AND ELECTROCHEMICAL DEVICE INCLUDING THE SAME

(71) Applicant: Contemporary Amperex Technology Co., Limited, Ningde (CN)

(72) Inventors: Huafeng Huang, Ningde (CN); Qisen Huang, Ningde (CN); Shiwen Wang, Ningde (CN); Chengdu Liang, Ningde (CN)

(73) Assignee: Contemporary Amperex Technology Co., Limited

( * ) Notice: Subject to any disclaimer, the term of this patent is extended or adjusted under 35 U.S.C. 154(b) by 117 days.

(21) Appl. No.: 16/211,552

(22) Filed: Dec. 6, 2018

(65) Prior Publication Data

US 2019/0198840 A1  Jun. 27, 2019

(30) Foreign Application Priority Data

Dec. 21, 2017  (CN) .......................... 2017 1 1396970

(51) Int. Cl.
| | | |
|---|---|---|
| *H01M 2/16* | (2006.01) | |
| *H01M 2/14* | (2006.01) | |
| *H01M 10/42* | (2006.01) | |
| *H01M 10/0525* | (2010.01) | |

(52) U.S. Cl.
CPC ......... *H01M 2/1686* (2013.01); *H01M 2/145* (2013.01); *H01M 2/1646* (2013.01); *H01M 2/1653* (2013.01); *H01M 10/4235* (2013.01); *H01M 10/0525* (2013.01)

(58) Field of Classification Search
CPC ............ H01M 2/16; H01M 2/14; H01M 2/02; H01M 2/12
See application file for complete search history.

(56) References Cited

U.S. PATENT DOCUMENTS

| | | | | |
|---|---|---|---|---|
| 2,673,230 A | * | 3/1954 | Brennan ............. | H01M 2/1653 |
| | | | | 429/137 |
| 2012/0315384 A1 | * | 12/2012 | Abd Elhamid ..... | H01M 2/1686 |
| | | | | 427/126.2 |
| 2016/0204408 A1 | | 7/2016 | Herle | |

FOREIGN PATENT DOCUMENTS

EP        2838137 A1    2/2015

* cited by examiner

*Primary Examiner* — Kenneth J Douyette
(74) *Attorney, Agent, or Firm* — Forge IP, PLLC (57) ABSTRACT

The present disclosure relates to the field of energy storage, and in particular to a separator, a method for preparing the separator, and an electrochemical device including the separator. The separator includes a porous substrate. At least one of a porous inorganic layer and an organic particle coating layer is provided on at least one surface of the porous substrate, and a composite layer is provided on at least one surface of the porous substrate. The composite layer includes a porous inorganic layer and an organic particle coating layer sequentially disposed on the surface of the porous substrate. The porous inorganic layer includes an inorganic dielectric material containing no binder. The organic particle coating layer is a coating discontinuously distributed on the porous inorganic layer. The composite layer has a mass of 0.2 g/m² to 8.4 g/m² per unit area.

19 Claims, 4 Drawing Sheets

SEPARATOR, METHOD FOR PREPARING THE SAME AND ELECTROCHEMICAL DEVICE INCLUDING THE SAME

CROSS-REFERENCE TO RELATED APPLICATIONS

The present application claims priority to Chinese Patent Application No. CN201711396970.8, filed on Dec. 21, 2017, the content of which is incorporated herein by reference in its entirety.

TECHNICAL FIELD

The present disclosure relates to the technical field of energy storage, and in particular, relates to a separator, a method for preparing the separator and an electrochemical device including the separator.

BACKGROUND

As an essential component of the internal structure of a battery, a separator is usually is a porous polymer film having characteristics of electron isolation and ion conduction, by which ions can be normally transferred between positive and negative electrodes without occurrence of short circuiting. In recent years, in order to solve problems of high thermal shrinkage and poor electrolyte wettability of a single polymer separator, a composite separator formed by applying ceramic coating on the surface of a polymer substrate has gradually become a pivotal technology for improving the safety performance of the battery. However, some problems with this kind of composite separator urge further development and research.

The ceramic coating of most of the separators is obtained by coating and drying slurry that is formed by mixing inorganic particles and binder. Although the uniformity of particle dispersion can be improved by adding a surfactant, it is difficult to completely address the problems of particle agglomeration, inhomogeneous distribution of components, and wettability between the substrate and the coating slurry. On the other hand, since ceramic layers on both sides of the substrate generally can be up to several micrometers, the thickness of the separator increases by at least 50%, thereby resulting in a decrease in energy density of the cell. At the same time, the ceramic layer and the polymer substrate are usually bonded by a binder, and the binding force in different areas is significantly affected by the distribution of the binder. As a result, cracks and aging on the surface of the ceramic layer, change in porosity, detachment of ceramic particles and the like are likely to occur during a coating process, a long-term circulation, or battery abuse, thereby leading to deterioration of the ion-conducting properties, and even causing serious safety problems. In addition, the manufacturing process of current commercial lithium batteries has a problem of poor bonding properties at the electrode plate interface, low hardness of the bare cell, misalignment and poor interface contact during the assembly process, thus resulting in inconsistency and low long-term reliability of cells.

SUMMARY

A first aspect of the present disclosure provides a separator. The separator includes a porous substrate. At least one surface of the porous substrate is provided with at least one of a porous inorganic layer and an organic particle coating layer, and at least one surface of the porous substrate is provided with a composite layer. The composite layer includes the porous inorganic layer and the organic particle coating layer sequentially disposed on the at least one surface of the porous substrate. The porous inorganic layer according to the present disclosure includes an inorganic dielectric material containing no binder. The organic particle coating layer is a coating discontinuously distributed on the porous inorganic layer. A per unit area mass of the composite layer is 0.2 g/m$^2$ to 8.4 g/m$^2$. Since the porous substrate has poor heat resistance, when preparing the inorganic layer, the substrate cannot be heated. Therefore, a stoichiometric deviation of the prepared porous inorganic layer is likely to occurs, resulting in slightly lower electrical and mechanical properties of the porous inorganic layer. Through dedicated researches, it has been found that the stability of interface between the separator and electrode place can be enhanced by compositing the organic particle coating layer on the porous inorganic layer. The organic particle coating layer not only forms a protection for the porous inorganic layer, but also provides available space for expansion of the electrode plate.

A second aspect of the present disclosure provides a method for preparing the separator according to the first aspect. The method includes at least following steps: preparing a porous inorganic layer on at least one surface of a porous substrate by using vapor deposition method; mixing organic particles and a solvent to obtain a mixture, preparing the mixture on the porous inorganic layer, and drying the organic particle coating layer.

A third aspect of the present disclosure provides an electrochemical device including the above separator.

The technical solutions of the present disclosure have at least the following beneficial effects:

The separator according to the present disclosure has high wettability with the electrolyte, almost no thermal shrinkage, excellent ion-transmission performance and good durability against corrosion. The electrochemical device using this separator has high interface stability. The hardness and deformation of the electrochemical device are effectively improved, thereby improving the cycling performance of the electrochemical device, reducing the cyclic expansion, and enhancing a long-term reliability of the electrochemical device.

DESCRIPTION OF EMBODIMENTS

The present disclosure is further described below by means of Embodiments and Comparative Examples. These Embodiments are merely used for illustrating the present disclosure, but not intended to limit the present disclosure. Any modification or equivalent substitution of the technical solutions of the present disclosure without departing from the scope of the technical solutions of the present disclosure shall fall within the protection scope of the present disclosure.

A separator according to a first aspect of embodiments of the present disclosure is firstly described as below.

Figure 1:
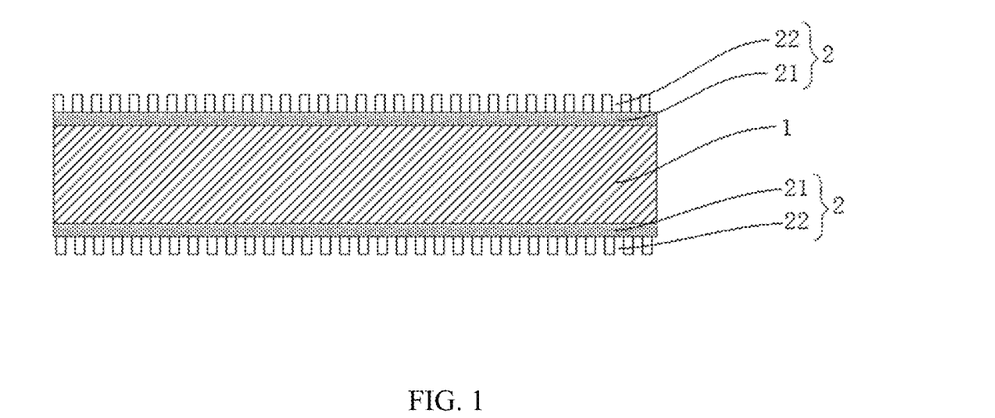
FIG. 1 is a schematic diagram of a separator according to an embodiment of the present disclosure.
Figure 2:
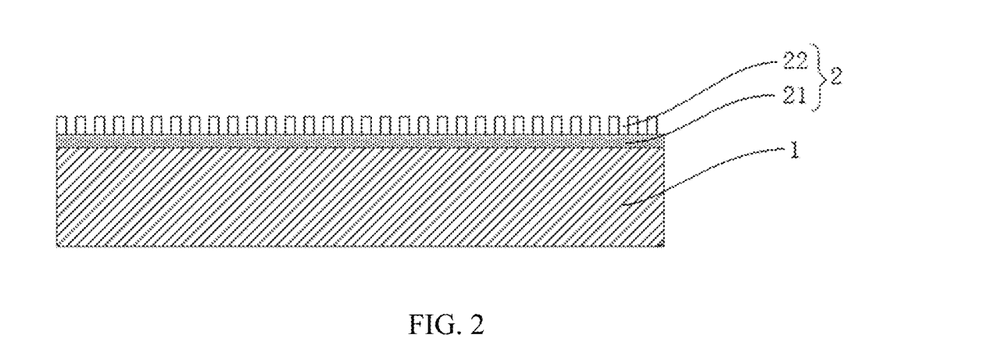
FIG. 2 is a schematic diagram of a separator according to another embodiment of the present disclosure.
Figure 3:
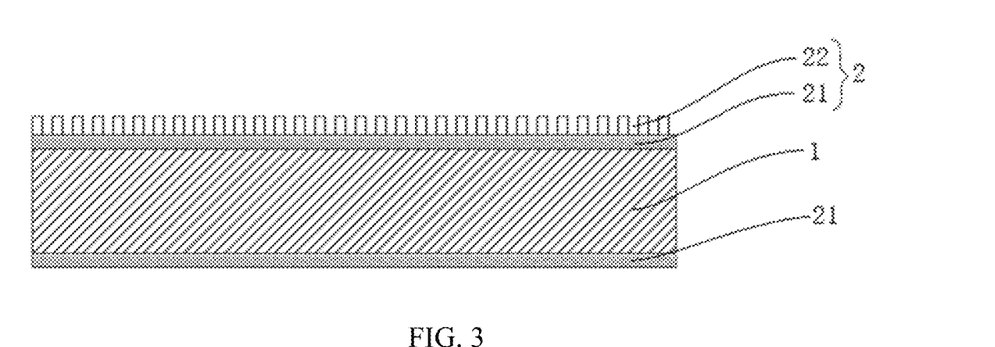
FIG. 3 is a schematic diagram of a separator according to another embodiment of the present disclosure.
Figure 4:
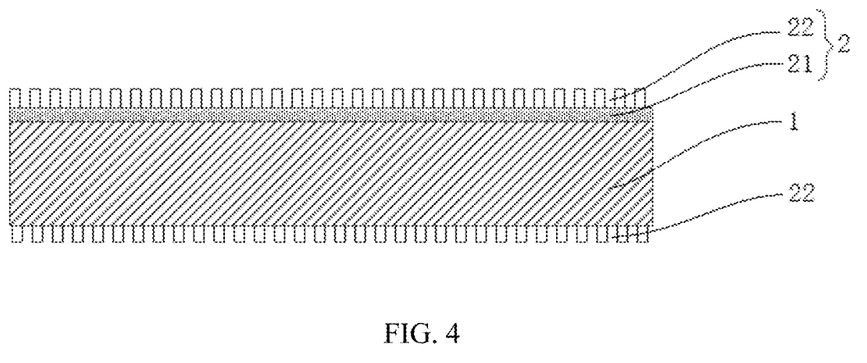
FIG. 4 is a schematic diagram of a separator according to another embodiment of the present disclosure.

According to the separator of the first aspect of the embodiments of the present disclosure, the separator includes a porous substrate. At least one of a porous inorganic layer and an organic particle coating layer is provided on at least one surface of the porous substrate, and a composite layer is provided on at least one surface of the porous substrate and includes a porous inorganic layer and an organic particle coating layer sequentially disposed on the surface of the porous substrate. Structural schematic diagrams of the separator are shown in FIGS. 1-4. As shown in FIG. 1, a composite layer 2 is provided on each of two surfaces of the porous substrate 1. The composite layer includes a porous inorganic layer 21 and an organic particle coating layer 22 that are sequentially disposed on a corresponding surface of the porous substrate 1. As shown in FIG. 2, a composite layer 2 is provided on only one surface of the porous substrate 1, and the composite layer includes a porous inorganic layer 21 and an organic particle coating layer 22 that are sequentially disposed on the one surface of the porous substrate 1. As shown in FIG. 3, a composite layer 2 is provided on one surface of the porous substrate 1 and a porous inorganic layer 21 is provided with on the other surface of the porous substrate 1. As shown in FIG. 4, a composite layer 2 is provided on one surface of the porous substrate 1 and an organic particle coating layer 22 is provided on the other surface of the porous substrate 1.

The composite layer means that a porous inorganic layer is firstly provided on at least one surface of the porous substrate, and then an organic particle coating layer is further provided on the porous inorganic layer.

Specifically, a surface of the porous substrate and at least a part of inner walls of the pores of the substrate are covered by the porous inorganic layer so as to form tight coating, thereby significantly reducing the thermal shrinkage of the separator and improving the safety performance of the cell. This may be due to the fact that the porous substrate is subjected to counterforce from all directions of the porous inorganic layer, which can inhibit its thermal shrinkage, when the porous substrate is under heat. In this way, after the separator according to the embodiment of the present disclosure is placed at 90° C. for 1 hour, thermal shrinkage hardly occurs in the longitudinal and transverse directions of the separator, and the safety performance of the cell is effectively improved.

The inorganic layer in the embodiment of the present disclosure is a porous inorganic layer, for example, an inorganic layer deposited by a vapor deposition method, which is formed by a plurality of disorderly stacked nanoclusters. Pores between the nanoclusters constitute channels for ion transmission, i.e., ions can pass through the pores, thereby effectively improving dynamic performance of the battery.

The porous inorganic layer according to the embodiment of the present disclosure does not contain a binder. That is, the porous inorganic layer is bond to the porous substrate by itself without the binder, so that the inorganic layer on the surface of the separator is prevented from peeling due to failure of the binder caused by swelling in the circulating process.

Since the porous substrate has poor heat resistance, when preparing the inorganic layer, the substrate cannot be heated at high temperature. Therefore, a stoichiometric deviation of the prepared porous inorganic layer is likely to occurs, resulting in the relatively lower electrical and mechanical properties of the porous inorganic layer compared with inorganic material with perfect stoichiometric composition.

In order to overcome this defect, a discontinuously distributed organic particle coating layer is prepared on the surface the porous inorganic layer according to the present disclosure.

Firstly, the organic particle coating layer can form a protective layer on the porous inorganic layer, thereby improving the stability of the interface between the separator and the electrode plate. Secondly, due to the non-continuous distribution of the organic particle coating layer, the pores of the polymer substrate and the inorganic layer of the separator are not completely blocked, which facilitates the rapid transmission of ions between the positive and negative electrodes without any adverse effect on the ion transmission performance of the separator. Thirdly, the organic particles of the organic particle coating layer are swelled in the electrolyte and transformed into a colloid with a certain viscosity for bonding the electrode plate with the separator, so as to ensure the interface stability of the internal structure of the cell, thereby avoiding lithium precipitation caused by a dislocation of the electrode plate, and also providing the cell with buffer space for volume swelling of the cell in the circulation process.

Figure 5:
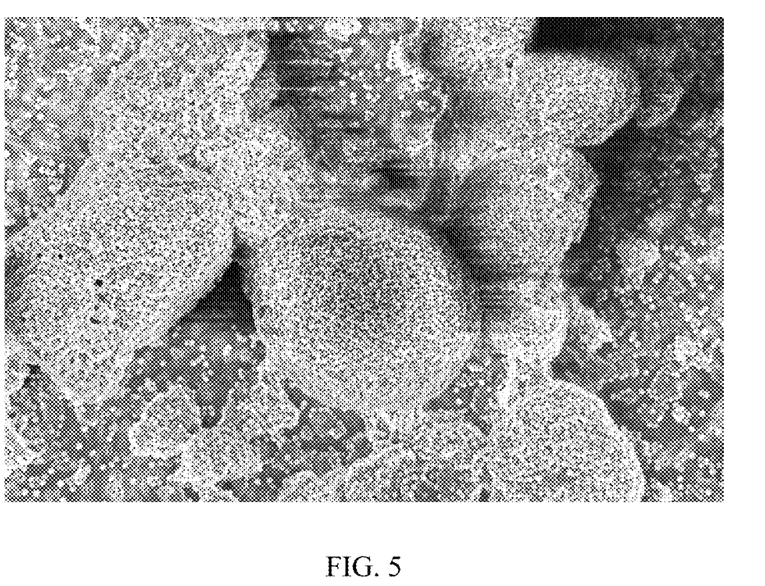
FIG. 5 is a photograph of a separator according to an embodiment of the present disclosure at a magnification of 5×10$^3$ times of a scanning electron microscope.

FIG. 5 shows a photograph of the organic particle coating layer according the embodiment of the present disclosure at a magnification of $5\times10^3$ times of a scanning electron microscope. As shown in FIG. 5, the organic particles are presented in a scattered state and randomly distributed on the separator prepared with an inorganic layer. Since the magnification of the photograph is limited and the pore diameter of the porous inorganic layer is small, the pores of the porous inorganic layer are invisible in this photograph.

In the embodiment of the present disclosure, a mass per unit area of the composite layer of the separator is 0.2 $g/m^2$ to 8.4 $g/m^2$. On the one hand, if a mass per unit area of the organic particle coating layer is too low, the island-like or sheet-like parts of coating are too sparse, leading to a poor binding between the separator and the electrode plate and insignificant improvement effect on the interface inside cell. On the other hand, if the mass per unit area of the organic particle coating layer is too high, the island-like or sheet-like parts of coating are too densely distributed, which can easily block the pores of the porous inorganic layer and the porous substrate, thereby lowering the air permeability and thus adversely affecting the dynamic performance of the separator. In addition, within the range of mass, the weight gain of the composite layer to the separator is limited, which is advantageous to ensure the weight-energy density of the separator.

The value of the mass per unit area of the composite layer is measured with a method including: cutting a porous substrate without composite coating into 20 pieces of 50 mm×50 mm square pieces; weighting the mass of each piece precisely by using a 6-digit precision balance and calculating an average value of mass as the quality of square piece, denoted as m0; depositing an inorganic dielectric layer on the cut porous substrate by adopting the vapor deposition method, weighing the mass of each piece and calculating an average value of mass, denoted as m1; and then roll-forming or spraying mixed slurry prepared with organic particles and water on the inorganic layer, weighting the mass of each piece precisely and calculating an average value of mass, denoted as m2. Therefore, the mass per unit area of the composite layer is (m2−m0)/25 cm$^2$.

As an improvement of the separator according to the embodiment of the present disclosure, the thickness of the porous inorganic layer is 20 nm to 2000 nm. An upper limit of the thickness of the porous inorganic layer can be 2000 nm, 1900 nm, 1800 nm, 1700 nm, 1600 nm, 1500 nm, 1400 nm, 1300 nm, 1200 nm, 1100 nm, 1000 nm, 990 nm, 950 nm, 900 nm, 850 nm, 800 nm, 750 nm, 720 nm, 700 nm, 680 nm, 650 nm, 600 nm, 550 nm, or 500 nm. A lower limit of the thickness of the porous inorganic layer can be 20 nm, 30 nm, 40 nm, 45 nm, 50 nm, 55 nm, 60 nm, 70 nm, 80 nm, 90 nm, 100 nm, 110 nm, 150 nm, 200 nm, 250 nm, 280 nm, 300 nm, 350 nm, 380 nm, 400 nm, 430 nm, 450 nm, or 490 nm. The range of thickness of the porous inorganic layer can be any range consisting of any value of the above upper limits and any value of the above lower limits. If the porous inorganic layer is too thick, it will have a certain adverse effect on the air permeability of the separator, thereby adversely affecting the rate performance of the battery, also increasing the thickness and weight of the separator and reducing the energy density of the battery. A too small porous inorganic layer has limited effect on improving the thermal shrinkage properties, wettability and other characteristics of the separator.

Further optionally, the thickness of the porous inorganic layer is preferably 50 nm to 1500 nm, and more preferably 100 nm to 1000 nm. Within the above range, not only the wettability of the separator and the electrolyte, the thermal shrinkage at 90° C., and the air permeability of the separator are not affected, but also the thickness and quality of the separator are almost unchanged, and even the energy density of the cell is increased.

As an improvement of the separator according to the embodiment of the present disclosure, the organic particle coating layer is an island-like or sheet-like coating that is discontinuously distributed on the surface of the inorganic layer. The organic particle coating layer has a thickness of 1 μm to 6 μm. An upper limit of the thickness of the organic particle coating layer can be 6 μm, 5.5 μm, 5 μm, 4.5 μm, 4 μm, 3.5 μm, 3 μm, 2.5 μm, or 2 μm. A lower limit of the thickness of the organic particle coating layer can be 1 μm, 1.2 μm, 1.5 μm, or 1.8 μm. The range of the thickness of the organic particle coating layer can be any range consisting of any value of the above upper limits and any value of the above lower limits. If the thickness of the organic particle coating layer is too small, the organic particle coating layer has limited contribution to the adhesion between the separator and the electrode plate and has no significant improvement on the interface inside the cell. If the thickness of the organic particle coating layer is too large, the thickness of the separator can be increased to a certain extent, thereby reducing the energy density of the battery, even the organic particle coating layer is discontinuously distributed.

Further optionally, the thickness of the organic particle coating layer is preferably 3 μm to 5 μm.

As an improvement of the separator according to the embodiments of the present disclosure, the porosity of the porous inorganic layer is 10% to 60%. An upper limit of the porosity of the porous inorganic layer is 60%, 55%, 50%, 45%, 42%, 40%, 38% or 35%. A lower limit of the porosity of the porous inorganic layer is 10%, 15%, 20%, 22%, 25%, 28%, or 30%. The range of the porosity of the porous inorganic layer can be any range consisting of any value of the above upper limits and any value of the above lower limits. If the porosity of the porous inorganic layer is too small, the air permeability of the separator is too low, which adversely affects the ion transmission performance, thereby leading to a poor dynamic performance of the battery. If the porosity of the porous inorganic layer is too large, the porous inorganic layer is too loose, which not only adversely affects the mechanical properties of the separator, but also is not conducive to supporting of organic particles contained in the organic particle coating layer, thereby resulting in a decrease in battery reliability during long-term use.

The porosity of the porous inorganic layer can be measured with a method including: cutting the porous substrate into two substrate films of a same area, wherein one is without any treatment and the other one is prepared with a porous inorganic layer; drying the two samples in a vacuum oven at 105° C. for 2 hours, respectively; taking out and placing the two samples in a desiccator for cooling; wrapping the samples with A4 papers; punching them with a punching machine after being flattened on a cutting die, so as to prepare the samples for the test; measuring the thickness of the samples with a tenthousandth micrometer, and calculating apparent volume of the samples based on the surface area and thickness of the samples, wherein the apparent volume of the bare porous substrate is denoted as V1 and the apparent volume of the porous substrate prepared with the porous inorganic layer is denoted as V2; and then measuring true volume of the samples with an AccuPyc II true density densitometer, wherein the true volume of the bare porous substrate is denoted as V3 and the true volume of the porous substrate prepared with the porous inorganic layer is denoted as V4. The porosity of the porous inorganic layer can be concluded as [V2−V4−(V1−V3)]/(V2−V1)×100%.

Further optionally, the porosity of the porous inorganic layer is preferably 20% to 40%.

As an improvement of the separator according to the embodiment of the present disclosure, the porous inorganic layer has pores for ion transmission. Under microscopic conditions, the porous inorganic layer of the embodiment of the present disclosure is formed by disorderly stacked nanoclusters, and pores between the nanoclusters constitute channels for ion transmission. The pores have an average pore diameter of 0.1 nm to 20 nm. If the average pore diameter of the pores is too small, the air permeability of the separator can be too low, which adversely affects the ion transmission performance, resulting in poor dynamic performance of the battery. If the average pore diameter of the pores is too large, on the basis of ensuring the above porosity, the inorganic layer structure is too loose and tends to collapse, leading to poor mechanical properties of the separator, which is not conducive to supporting of the organic particles in the organic particle coating layer, and further resulting in a decrease in the reliability of the battery during long-term use.

Figure 6:
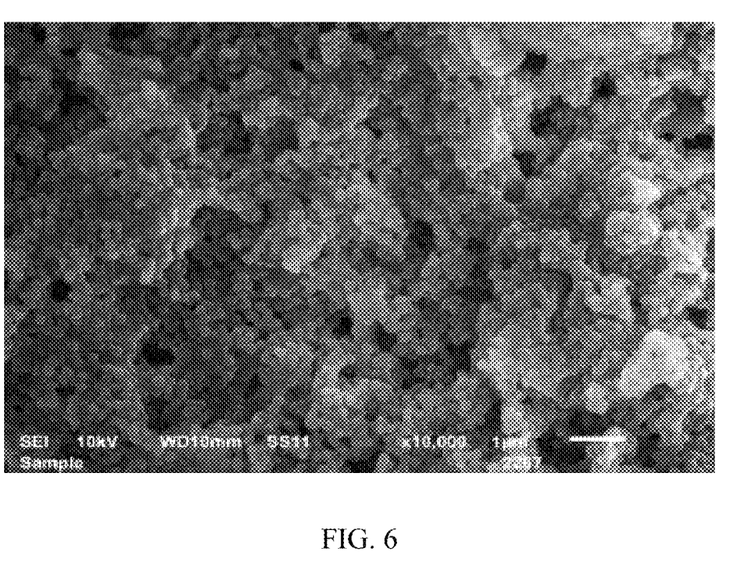
FIG. 6 is a photograph of a separator according to an embodiment of the present disclosure at a magnification of 10$^4$ times of a scanning electron microscope.
Figure 7:
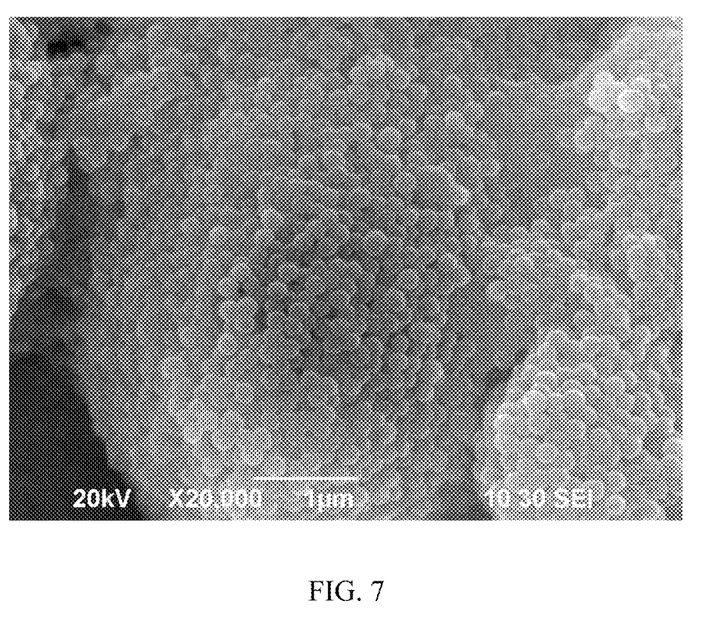
FIG. 7 is a photograph of a separator according to an embodiment of the present disclosure at a magnification of 2×10$^4$ times of a scanning electron microscope.

As an improvement of the separator according to the embodiment of the present disclosure, the organic particles in the organic particle coating layer have an average particle diameter of 100 nm to 300 nm. Specifically, scanning electron microscope photographs of the organic particle coating layer having this average particle diameter are shown in FIGS. 6 and 7. FIG. 6 is a photograph of the organic particle coating layer at a magnification of $10^4$ times of a scanning electron microscope. As shown in FIG. 6, the organic particles in the organic particle coating layer are agglomerated with particles having an average particle diameter of 200 nm, and pores can also be formed. If the average particle diameter of the organic particles is too large, the organic particles are unlikely to swell in the electrolyte to form a colloid, thereby reducing the interface stability. FIG. 7 is a detailed photograph of the organic particle coating layer at a magnification of $2\times10^4$ times of a scanning electron microscope.

Optionally, the organic particles in the organic particle coating layer have an average particle diameter of 150 nm to 250 nm.

As an improvement of the separator according to the embodiment of the present disclosure, a material of the organic particles in the organic particle coating layer contains a viscous organic material, wherein the viscous organic material can be an organic material having a certain viscosity at normal atmospheric temperature, and also can be an organic material having a certain viscosity under a heating condition. Specifically, the organic material having a certain viscosity under a normal atmospheric temperature refers to an organic material having a 180° peeling force greater than 0.1 N/mm at normal atmospheric temperature (15° C. to 20° C.), and the organic material having a certain viscosity under a heating condition is an organic material having a 180° peeling force greater than 0.1 N/mm at 100° C.-150° C.

The peeling force can be specifically measured by a method including: cutting a sample into strips having a width of 20 mm; before the measurement, affixing a double-sided tape to a stainless steel plate and then uniformly affixing the prepared strips to the double-sided tape; and performing a measurement of peeling force of 50 mm/min to obtain the maximal peeling force F (in a unit of N) with aid of a tensionmeter, thereby resulting in a peeling force of F/20 (in a unit of N/mm).

With respect to the organic particles prepared by using the viscous organic material described above, during the preparation of the organic particle coating layer, any binder is not required to be added, instead, it is only needed to mix and disperse the organic particles and the solvent, and then to perform a coating. In a case of employing the organic material having a certain viscosity under a high temperature condition, only a drying process is additionally required.

Further optionally, the viscous organic material is selected from a group consisting of polyvinylidene fluoride, vinylidene fluoride-hexafluoropropylene copolymer (PVDF-HFP), polyacrylonitrile (PAN), polyimide (PI), acrylonitrile-butadiene copolymer (NBR), acrylonitrile-styrene-butadiene copolymer (ABS), polymethyl methacrylate (PMMA), poly(methyl acrylate), polyethyl acrylate, acrylic styrene copolymer, polydimethylsiloxane, sodium polyacrylate, and sodium carboxymethyl cellulose (CMC), and combinations thereof. The viscous organic material can form a sol with a certain viscosity after swelling, so as to bind the separator with the electrode plate, thereby preventing a relative displacement between the electrode plates. In this way, the stability of the interface can be improved.

In addition to the above-mentioned viscous organic material, the organic particles according to the embodiments of the present disclosure can also contain a partially non-viscous organic material, and the doping ratio thereof only needs to satisfy the binding with the porous inorganic layer. Those skilled in the art can make a selection based on a specific material.

As an improvement of the separator according to the embodiment of the present disclosure, the mass percentage of the organic particle coating layer is 1 wt % to 60 wt % with respect to the total mass of the composite layer, and the area percentage of the organic coating is 50% to 80% with respect to the total area of the composite layer. An upper limit of the mass percentage of the organic particle coating layer is 50%, 48%, 45%, 40%, 35%, 30%, 25%, and 22% with respect to the total mass of the composite layer. A lower limit of the mass percentage of the organic particle coating layer is 5%, 8%, 10%, 15%, 18%, and 20% with respect to the total mass of the composite layer. The mass percentage of the organic particle coating layer with respect to the total mass of the composite layer can be in any range consisting of any value of the above upper limits and any value of the above lower limits. If the mass percentage of the organic particle coating layer is too low, the improvement of the adhesion between the separator and the electrode plate is limited, leading to an insignificant improvement effect on the interface inside the cell. If the mass percentage of the organic particle coating layer is too high, the pores of the porous inorganic layer and the porous substrate are easily to be blocked, thereby reducing the air permeability and adversely affecting the dynamic properties of the separator.

Further optionally, the mass percentage of the organic particle coating layer is preferably 1 wt % to 20 wt % with respect to the total mass of the composite layer. A ratio of the area of the organic particle coating layer to the total area of the composite layer is 60% to 70%.

As a modification of the separator according to the embodiment of the present disclosure, the porous inorganic layer contains $AlO_x$, and $1.45 \leq x \leq 1.55$. The specific x can be calculated by using X-ray Photoelectron Spectroscopy (XPS) technology to precisely analyze the elemental contents of Al and O in the inorganic layer material. Since the porous substrate has poor heat resistance, when preparing the inorganic layer, the substrate cannot be heated at high temperature. Therefore, a stoichiometric deviation of the prepared porous inorganic layer is likely to occur, resulting in the slightly lower electrical and mechanical properties of the porous inorganic layer. When the stoichiometric ratio or superstoichiometric ratio in aluminum oxide is too great ($x<1.45$ or $x>1.55$), the insulation performance and chemical stability are greatly affected. When aluminum oxide is used as a protective layer on the surface of the separator, a corrosive decomposition is likely to occur in the electrolyte environment, resulting in an increase in the thermal shrinkage percentage of the separator and a decrease in mechanical strength.

As an improvement of the separator according to the embodiment of the present disclosure, the inorganic layer can contain other inorganic substances in addition to $AlO_x$, and the mass of $AlO_x$ in the porous inorganic layer accounts for 50% to 100%, preferably 80% to 100% of the mass of the porous inorganic layer.

As an improvement of the separator according to the embodiment of the present disclosure, the porous inorganic layer further contains at least one of silicon oxide, silicon nitride, titanium oxide, titanium nitride, zinc oxide, zinc nitride, magnesium oxide, magnesium nitride, zirconium oxide, zirconium nitride, calcium oxide, calcium nitride, barium oxide, or barium nitride.

As an improvement of the separator according to the embodiment of the present disclosure, on one surface of the porous substrate, the porous inorganic layer uniformly covers the surface and at least a portion of inner walls of the pores of the substrate. In the embodiment of the present disclosure, the thickness of the porous inorganic layer is relatively thin. The porous layer can be deposited not only on the surface of the porous substrate but also on at least a portion of the inner walls of the pores when being prepared with the vapor deposition method. As the coverage of the porous substrate by the inorganic layer is increased, the effect of suppressing the thermal shrinkage of the inorganic substrate on the porous substrate is more significant, and the tensile strength of the separator is also increased, thereby effectively improving the safety of the cell. Further optionally, the porous inorganic layer uniformly covers the surface and the inner walls of all the pores on the surface.

As an improvement of the separator according to the embodiment of the present disclosure, the porous inorganic layer uniformly covers the pores on the surface to a depth of $1/50$ to $1/20$ of the thickness of the porous substrate. In a specific preparation process, for example, when a vapor deposition method is used, the coating depth of the inorganic layer inside the porous substrate gradually deepens as the deposition thickness increases. However, if the coating is too deep, for example, greater than $1/20$ of the thickness of the porous substrate, the pores of the porous substrate can be blocked by a large amount of inorganic material, resulting in a deterioration of the ion conduction performance of the battery. If the inorganic layer coats the inner walls of the porous substrate to a shallow depth, for example smaller than $1/50$ of the thickness of the porous substrate, there is a large exposed polymer surface inside the porous substrate, which can shrink under heat, due to an insufficient bonding force of the inorganic layer.

As an improvement of the separator according to the embodiment of the present disclosure, the interfacial peeling force between the inorganic layer and the substrate is not smaller than 30 N/m.

As an improvement of the separator according to the embodiment of the present disclosure, the porous inorganic layer is prepared by the vapor deposition method. Since the inorganic layer prepared by the vapor deposition method has a stable structure and stable properties, and the formed porous inorganic layer has good uniformity, the thickness deviation can be controlled within ±5%. In addition, molecules of the inorganic layer and the porous substrate are chemically bonded, so that the inorganic layer and the porous substrate have strong bonding force and are unlikely to be peeled off. The bonding force between the porous inorganic layer and the porous substrate is not smaller than 30 N/m in an interfacial peeling force test. Therefore, the vapor deposition method can reduce the thickness of the inorganic layer to a certain extent, improve the bonding force with the porous substrate, and does not affect the wettability of the separator and the electrolyte, the thermal shrinkage at 90° C. and the air permeability.

Preferably, the vapor deposition method includes Atomic Layer Deposition (ALD), Chemical Vapor Deposition (CVD), Physical Vapor Deposition (PVD) and Thermal Evaporation Deposition. Preferably, plasma assisted thermal evaporation deposition, reactive ion beam sputtering deposition method, electron beam evaporation method, magnetron sputtering method, or plasma arc plating method can be used.

As an improvement of the separator according to the embodiment of the present disclosure, material of the porous substrate can be selected from a group consisting of polyethylene (PE), polypropylene (PP), polyvinylidene fluoride (PVDF), aramid fiber, polyethylene glycol terephthalate (PET), polytetrafluoroethylene (PTFE), polyacrylonitrile (PAN), polyimide (PI), polyamide, polyester, natural fiber, or combinations thereof.

As an improvement of the separator according to the embodiment of the present disclosure, the porous substrate has a thickness of 5 μm to 50 μm, preferably 8 μm to 30 μm, and more preferably 8 μm to 20 μm.

As an improvement of the separator according to the embodiment of the present disclosure, the porous substrate has a porosity of 30% to 70%, preferably 40% to 60%.

As an improvement of the separator according to the embodiment of the present disclosure, after being placed at 90° C. for 1 hour, the separator has a thermal shrinkage both in the transverse and longitudinal directions smaller than 2%, preferably smaller than 1%.

As an improvement of the separator according to the embodiment of the present disclosure, the tensile strength of the separator in the transverse and longitudinal directions is not smaller than 1200 kgf/cm$^2$.

According to a second aspect of the present disclosure, a method for preparing a separator is explained below.

At Step 1, a porous inorganic layer is prepared on at least one surface of a porous substrate by means of vapor deposition method.

At Step 2, organic particles and a solvent are mixed to obtain a mixture, and the mixture is prepared on the porous inorganic layer and then dried to obtain the organic particle coating layer.

Before performing the vapor deposition method, the surface of the porous substrate can be pretreated in following manners: a low-temperature plasma surface treatment, a coupling agent treatment, a corona treatment, or a surfactant treatment.

In Step 1, the vapor deposition method includes Atomic Layer Deposition (ALD), Chemical Vapor Deposition (CVD), Physical Vapor Deposition (PVD) and Thermal Evaporation Deposition. Preferably, plasma assisted thermal evaporation deposition, reactive ion beam sputtering deposition method, electron beam evaporation method (EBEM), magnetron sputtering method, or plasma arc plating method can be used.

In Step 2, preparing the mixture on the porous inorganic layer includes at least one of intaglio printing process, extrusion coating method, and spray coating method.

Further optionally, the solvent is water or organic solvent. The organic solvent can be selected from those having good volatility and being immiscible with the material of the organic particles, and specifically can be selected according to the specific type of an organic material. The concentration of the organic particles and the solvent in the mixture is 5 wt % to 15 wt % after being mixed.

The organic particles are selected from viscous organic materials, and specifically, selected from a group consisting of polyvinylidene fluoride, vinylidene fluoride-hexafluoropropylene copolymer (PVDF-HFP), polyacrylonitrile (PAN), polyimide (PI), acrylonitrile-butadiene copolymer (NBR), acrylonitrile-styrene-butadiene copolymer (ABS), polymethyl methacrylate (PMMA), poly(methyl acrylate), polyethyl acrylate, acrylic styrene copolymer, polydimethylsiloxane, sodium polyacrylate, and sodium carboxymethyl cellulose (CMC), or combinations thereof.

In the method for preparing a separator according to the second aspect of the embodiment of the present disclosure, the inorganic layer is deposited by means of a thermal evaporation gas phase reaction method, which includes the following steps:

Step (1): evacuating a deposition chamber to a pressure of 0.001 Pa or lower;

Step (2): introducing a reactive gas 'a' into the deposition chamber;

Step (3): heating a precursor 'b' of the porous inorganic layer in a heating chamber into a gaseous precursor, and introducing the gaseous precursor into the deposition chamber;

Step (4): adjusting flow rate of the gas source, the substrate temperature, and the deposition distance in the deposition chamber, so that the reactive gas 'a' chemically reacts with the gaseous precursor 'b' to form the porous inorganic layer on the surface of the porous substrate.

The reactive gas 'a' can be selected from a group consisting of oxygen, ozone, carbon dioxide, steam, nitrogen, nitric oxide, nitrogen dioxide, ammonia, or combinations thereof. The corresponding precursor 'b' of the inorganic substance can be selected from a groups consisting of pure metals, alloys, metal alkyl compounds, metal nitrate compounds, metal acetate compounds, and metal sulfuric acids of Al, Si, Ti, Zn, Mg, Zr, Ca, Zn or Ba, or combinations thereof.

The heating current in Step (3) is 50 A~300 A.

In Step (4), the substrate temperature is lower than 100° C., the volume flow of the reactive gas is 100 sccm to 2000 sccm, and plasma can be introduced into the reaction space to increase the activity of the reactive gases.

An electrochemical device according to a third aspect of the embodiments of the present disclosure will be described. The electrochemical device of the present disclosure can be a lithium ion secondary battery, a lithium primary battery, a sodium ion battery, or a magnesium ion battery, but not limited thereto.

The following takes a lithium ion secondary battery as an example to further describe the embodiment of the present disclosure.

The lithium ion secondary battery includes a positive electrode plate, a negative electrode plate, a separator, and electrolyte. The separator is the separator according to the first aspect of the embodiments of the present disclosure.

The separator and the preparing method thereof according to the embodiments of the present disclosure, and the examples and comparative examples of lithium ion secondary batteries will be described below.

Separator

In the embodiments of the present disclosure, a material of the substrate of the separator is not particularly limited, and the separator can be a polymer separator. The above polymer separator can be selected from polyethylene, polypropylene or ethylene-propylene copolymers.

The method for preparing the porous inorganic layer will be exemplified by using the plasma-assisted thermal evaporation deposition as an example.

The heating source is an electron beam, and the heating target is a single element (such as Al, Si, Mg, etc.) except for oxygen in the inorganic layer. Under a vacuum condition, an oxygen-containing active gas (e.g., oxygen, ozone, oxygen ions, nitrogen monoxide, nitrogen dioxide, carbon dioxide, water vapor, etc.) is used as a reactive gas. The substrate temperature is controlled to be smaller than 100° C. Adjusting the heating current (50 A~300 A), the vacuum degree of process chamber ($10^{-1}$ Pa~$10^{-3}$ Pa), the oxygen volume flow (100 sccm~2000 sccm), the plasma power (300 W~600 W) and the process time, can further adjust the deposition rate of the inorganic layer on the surface of the porous substrate, the thickness, composition, and micromorphology of the inorganic layer.

Under observation with electron microscope, the porous inorganic layer prepared by the above process is formed by disorderly stacked nanoclusters, a plurality of nanoclusters forms pores, and an average pore diameter of the pores is 0.1 nm to 20 nm.

A method of preparing the organic particle coating layer will be described as follows.

The organic particles are mixed in water to form a uniformly mixed slurry, and the organic particles account for 5 wt % to 15 wt % of the mixed slurry. The mixed slurry is coated on the surface of the porous inorganic layer with a method selected from intaglio printing process, extrusion coating method and spray coating method, and then dried so as to evaporate the solvent and obtain the organic particle coating layer. Under observation with electron microscope, the organic particle coating layer was discontinuously distributed on the surface of the porous inorganic layer.

Preparation of Positive Electrode Plate

A positive electrode active material, a conductive agent of acetylene black (SP), and a binder of polyvinylidene fluoride (PVDF) are mixed at a weight ratio of 96:2:2. N-methylpyrrolidone is added as solvent, mixed and stirred to obtain a positive electrode slurry. The positive electrode slurry is uniformly coated on an aluminum foil that acts as a positive electrode current collector, followed by drying at 85° C., cold-pressed, trimmed, cut, and finally dried at 85° C. under vacuum for 4 hours to obtain a positive electrode plate. The positive electrode active material used therein can be a layered lithium transition metal oxide, lithium-rich manganese-based oxide, lithium iron phosphate, lithium cobaltate, or a doped or coated positive electrode active material thereof. In this embodiment, the layered lithium transition metal oxide $LiNi_{0.8}Co_{0.1}Mn_{0.1}O_2$ is taken as an example.

Preparation of Negative Electrode Plate

A negative electrode active material of artificial graphite, a conductive agent of acetylene black, a binder of styrene butadiene rubber (SBR), and a thickener of carboxymethyl cellulose sodium (CMC) are mixed at a weight ratio of 96:1:2:1. Deionized water is added as solvent, mixed and stirred to obtain negative electrode slurry. The negative electrode slurry is uniformly coated on a copper foil that acts as a negative electrode current collector, followed by drying at 80° C. to 90° C., then cold-pressed, trimmed, cut, and finally dried at 110° C. under vacuum for 4 hours to obtain a negative electrode plate.

Preparation of Electrolyte

A basic electrolyte is prepared with dimethyl carbonate (DMC), ethyl methyl carbonate (EMC) and ethylene carbonate (EC) in a mass ratio of 5:2:3. An electrolyte salt is then added therein so that the concentration of lithium hexafluorophosphate in the electrolyte was 1 mol/L.

Preparation of Lithium Ion Secondary Battery

The negative electrode plate, the separator, and the positive electrode plate are stacked in a sequence of that the separator is placed between the positive electrode plate and the negative electrode plate, and the surface of the separator with coating faces to the positive electrode plate, and then wound into a bare square cell having a thickness of 8 mm, a width of 60 mm and a length of 130 mm. The bare cell is packed in an aluminum foil pouch, vacuum-baked at 75° C. under vacuum for 10 hours, filled with non-aqueous electrolyte, stood for 24 hours after being vacuum-sealed, and then charged. In the charging process, the battery is charged to 4.2 V with a constant current of 0.1 C (160 mA), the charge voltage is kept at 4.2V until the current dropped to 0.05 C (80 mA). Then the battery is discharged to 3.0 V with a constant current of 0.1C (160 mA). After the charge-discharge is repeated for 2 times, the battery is charged to 3.8 V with the constant current of 0.1 C (160 mA), so as to finish the preparation of the lithium ion secondary battery.

Embodiments

Lithium-ion secondary batteries can be prepared by the above method. Specifically, a polyethylene film having a porosity of 60% and a thickness of 18 μm was selected as the porous substrate. Porous alumina layers of $AlO_x$ were prepared on the upper and lower surfaces of the porous substrate by the above vapor deposition, with $1.45 \leq x \leq 1.55$.

A discontinuously distributed organic particle coating layer was then prepared using the method described above.

The specific process parameters are: the target is a metal aluminum material, the vacuum degree of the deposition chamber is smaller than $1 \times 10^{-3}$ Pa, the heating evaporation current is 190 A when using Al as the target, the oxygen is the active gas with a volume flow of 300 sccm, the plasma power is about 300 W, and the process time is 5 min.

(2) Test for Thermal Shrinkage Percentage of the Separator

Each sample was cut into a square of 100 mm in length and 100 mm in width, and marked in the longitudinal direction (MD) and transverse direction (TD). Then, the lengths in MD and TD were measured with a projection tester and recorded as L1 and L2. Each sample was then placed in an air-circulating oven at 90° C., taken out after one hour, and lengths in the MD and TD were measured again with the projection tester and recorded as L3 and L4.

A heat shrinkage in MD=(L1−L3)/L1×100%;

A heat shrinkage in TD=(L2−L4)/L2×100%.

(3) Test for Tensile Strength of the Separator

Each sample having a fixed thickness T was punched into a sheet of 100 mm×15 mm in MD (longitudinal direction)/TD (width direction) with a die cutter, and then the sheet was placed to be perpendicular to a clamping chuck of the tensionmeter and was fixed and tightened with an upper and

TABLE 1

| | Porous Inorganic Layer | | Organic Particle Coating Layer | | | |
|---|---|---|---|---|---|---|
| No. | Thickness | Porosity | Material | Thickness | Average Diameter of Organic Particles | Mass Percentage in Composite Layer | Mass per Unit Area of Composite Layer (g/m²) |
| Separator 1 | 20 nm | 40% | PVDF | 2 μm | 200 nm | 60.0% | 0.25 |
| Separator 2 | 50 nm | 39.5% | PVDF | 2 μm | 200 nm | 37.5% | 0.40 |
| Separator 3 | 100 nm | 39.4% | PVDF | 2 μm | 200 nm | 23.1% | 0.65 |
| Separator 4 | 500 nm | 39.8% | PVDF | 2 μm | 200 nm | 7.7% | 1.95 |
| Separator 5 | 1000 nm | 41.1% | PVDF | 2 μm | 200 nm | 4.0% | 3.75 |
| Separator 6 | 1500 nm | 40.2% | PVDF | 2 μm | 200 nm | 2.7% | 5.55 |
| Separator 7 | 2000 nm | 40.5% | PVDF | 2 μm | 200 nm | 2.0% | 7.35 |
| Separator 8 | 2250 nm | 40.2% | PVDF | 2 μm | 200 nm | 1.8% | 8.25 |
| Separator 9 | 10 nm | 40.2% | PVDF | 2 μm | 200 nm | 75.0% | 0.20 |
| Separator 10 | 600 nm | 8.1% | PVDF | 2 μm | 200 nm | 6.5% | 2.31 |
| Separator 11 | 600 nm | 10.4% | PVDF | 2 μm | 200 nm | 6.5% | 2.31 |
| Separator 12 | 600 nm | 20.6% | PVDF | 2 μm | 200 nm | 6.5% | 2.31 |
| Separator 13 | 600 nm | 60.5% | PVDF | 2 μm | 200 nm | 6.5% | 2.31 |
| Separator 14 | 600 nm | 69.6% | PVDF | 2 μm | 200 nm | 6.5% | 2.31 |
| Separator 15 | 600 nm | 39.5% | PVDF | 0.5 μm | 200 nm | 1.7% | 2.20 |
| Separator 16 | 600 nm | 39.6% | PVDF | 1 μm | 200 nm | 3.4% | 2.24 |
| Separator 17 | 600 nm | 39.7% | PVDF | 4 μm | 200 nm | 12.2% | 2.46 |
| Separator 18 | 600 nm | 39.4% | PVDF | 6 μm | 200 nm | 17.2% | 2.61 |
| Separator 19 | 600 nm | 39.2% | PVDF | 8 μm | 200 nm | 21.7% | 2.76 |
| Separator 20 | 600 nm | 39.6% | PVDF | 2 μm | 50 nm | 6.5% | 2.31 |
| Separator 21 | 600 nm | 39.8% | PVDF-HFP | 2 μm | 200 nm | 6.5% | 2.31 |
| Separator 22 | 600 nm | 39.8% | PAN | 2 μm | 200 nm | 6.5% | 2.31 |
| Separator 23 | 600 nm | 39.8% | PI | 2 μm | 200 nm | 6.5% | 2.31 |
| Separator 24 | 600 nm | 39.8% | NBR | 2 μm | 200 nm | 6.5% | 2.31 |
| Separator 25 | 600 nm | 39.8% | ABS | 2 μm | 200 nm | 6.5% | 2.31 |
| Separator 26 | 600 nm | 39.8% | PET | 2 μm | 200 nm | 6.5% | 2.31 |
| Separator D1 | 600 nm | 39.9% | — | — | — | — | 2.16 |
| Separator D2 | — | — | — | — | — | — | — |

In Table 1, "—" indicates that the layer is absent.

Test procedures and test results of the separators and the lithium ion secondary batteries will be described below (1) Interfacial Peeling Force Test At a room temperature and under a normal pressure, 3M double-sided tape was evenly affixed to a stainless steel plate, then each sample was evenly affixed to the double-sided tape in a width of 2 cm, and the sample was peeled from the steel plate by using a tensionmeter. According to a data chart about pulling forces and displacement distances, the maximal pulling force F(N) can be read, and the measured bonding force was F/0.02.

lower chucks with both initial heights of 5 cm. The tension rate was set at 50 mm/min and then the maximal tensile strength F was measured.

Tensile Strength=$F/9.8/(15 \text{ mm} \times T)$.

According to the measurement results, the separators 1 to 26 all satisfy that the tensile strength in the MD is not smaller than 1200 kgf/cm², and the tensile strength in the TD is not smaller than 1200 kgf/cm².

(4) Test for Air Permeability of the Separator

Each sample was prepared into a size of 4 cm×4 cm under a temperature of 15° C. to 28° C. and a humidity smaller than 80%, and was measured using an air-permeability-tester with a Gurley test (100 cc) method. The air permeability value can be obtained directly.

(5) Test for Wettability of the Separator

Figure 8:
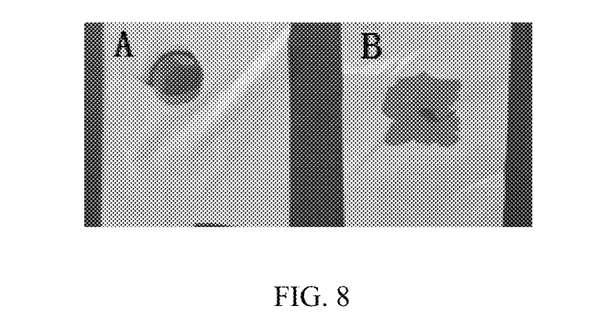
FIG. 8 is an experimental result of comparing wettability of separators according to embodiments of the present disclosure, wherein 1—porous substrate;
2—composite layer;
21—porous inorganic layer;
22—organic particle coating layer.

Each sample was placed on a water contact angle tester, a drop of deionized water was dropped at a height of 1 cm above the separator, and the drop of water fell on the sample surface was photographed by an optical microscope and a high-speed camera. The experimental results are shown in FIG. 8. In FIG. 8, part A is a photograph of the separator D2 after the drop fell. As can be seen from part A, the separator D2 was uneasily to be wetted by the drop of water. Part B is a photograph of the separator 20 after the drop fell. As can be seen from Part B, the separator 20 was completely wetted by the drop of water.

The experimental results of the physical properties of the above separators are shown in Table 2.

(6) Test for Capacity of Lithium-Ion Secondary Battery

In an incubator at 25° C., the battery was charged to a voltage of 4.2 V with a constant current of 0.1 C, the charge was kept at voltage of 4.2 V until the current was dropped to 0.05 C. Then the battery was discharged to a voltage 2.8 V with the constant current of 0.1 C. The discharge capacity was the capacity of the battery.

(7) Test for Cycling Performance at Ambient Temperature Lithium-Ion Secondary Battery At a temperature of 25° C., the battery was charged to a voltage of 4.35 V with a constant current of 0.7 C, the charge was kept at voltage of 4.35 V until the current was dropped to 0.05 C, and then the battery was discharged to a voltage 3.0 V with the constant current of 0.1 C. This is a charge-discharge cycle which was repeated 1000 times.

Capacity retention after 1000 cycles=discharge capacity after the $1000^{th}$ cycle/discharge capacity after the first cycle×100%.

(8) Test for High Temperature Storage and Gas Generation

Five batteries were selected respectively from the batteries of Example 1 and Comparative Example 1, and charged to a voltage higher than 4.2 V with a constant current of 0.3 C at a room temperature and further charged at a constant voltage of 4.2 V until the current fell to 0.05 C so that the batteries were kept in a full charge state of 4.2V. An internal pressure of each of the full-charged batteries was measured and recorded as $P_0$ before the storage. The batteries then were placed in an oven at 80° C. for 15 days and then taken out. After the batteries were cooled for 1 h, the internal pressure of each of the full-charged batteries was recorded as $P_n$.

According to a formula: $\Delta P=P_n-P_0$, a pressure change value before and after the storage of the batteries are calculated according to a formula: $\Delta P=P_n-P_0$.

Shown in Table 3 are the experimental results of the electrochemical properties of the lithium-ion secondary batteries prepared by using the above separators.

TABLE 2

Physical Properties of Separators

| No. | Interfacial Peeling Force (N/m) | Thermal Shrinkage Percentage | | Air Permeability (s) |
|---|---|---|---|---|
| | | MD (%) | TD (%) | |
| Separator 1 | 34 | 1.96 | 0.19 | 110 |
| Separator 2 | 34 | 1.43 | −0.12 | 134 |

TABLE 2-continued

Physical Properties of Separators

| No. | Interfacial Peeling Force (N/m) | Thermal Shrinkage Percentage | | Air Permeability (s) |
|---|---|---|---|---|
| | | MD (%) | TD (%) | |
| Separator 3 | 39 | 0.98 | −0.09 | 142 |
| Separator 4 | 39 | 0.96 | −0.13 | 183 |
| Separator 5 | 37 | 0.11 | −0.11 | 201 |
| Separator 6 | 35 | 0.40 | −0.08 | 193 |
| Separator 7 | 32 | 0.40 | 0.20 | 276 |
| Separator 8 | 29 | 0.48 | −0.18 | 324 |
| Separator 9 | 38 | 2.72 | 0.01 | 112 |
| Separator 10 | 39 | 0.83 | 0.07 | 183 |
| Separator 11 | 34 | 0.99 | −0.01 | 180 |
| Separator 12 | 32 | 0.61 | −0.20 | 184 |
| Separator 13 | 33 | 0.77 | −0.09 | 183 |
| Separator 14 | 38 | 0.51 | 0.02 | 183 |
| Separator 15 | 37 | 0.70 | 0.05 | 190 |
| Separator 16 | 34 | 0.49 | −0.12 | 181 |
| Separator 17 | 38 | 0.53 | −0.08 | 181 |
| Separator 18 | 38 | 0.85 | 0.05 | 187 |
| Separator 19 | 40 | 0.96 | 0.10 | 186 |
| Separator 20 | 31 | 0.53 | −0.03 | 180 |
| Separator 21 | 37 | 0.49 | 0.20 | 183 |
| Separator 22 | 38 | 0.85 | 0.07 | 188 |
| Separator 23 | 35 | 0.43 | −0.14 | 188 |
| Separator 24 | 32 | 0.45 | −0.12 | 168 |
| Separator 25 | 32 | 0.94 | 0.20 | 187 |
| Separator 26 | 33 | 0.42 | 0.16 | 182 |
| Separator D1 | 38 | 0.46 | −0.18 | 188 |
| Separator D2 | — | 2.3 | 0.4 | 108 |

TABLE 3

Electrochemical Properties of Separators

| No. | | Battery Capacity/ mAh | Capacity Retention Percentage after 1000 Cycles | Average Pressure Change/MPa |
|---|---|---|---|---|
| Battery 1 | Separator 1 | 1617 | 88.4% | 0.446 |
| Battery 2 | Separator 2 | 1617 | 89.3% | 0.321 |
| Battery 3 | Separator 3 | 1664 | 89.2% | 0.222 |
| Battery 4 | Separator 4 | 1680 | 90.2% | 0.172 |
| Battery 5 | Separator 5 | 1691 | 91.1% | 0.141 |
| Battery 6 | Separator 6 | 1643 | 90.9% | 0.211 |
| Battery 7 | Separator 7 | 1645 | 90.5% | 0.216 |
| Battery 8 | Separator 8 | 1654 | 90.1% | 0.172 |
| Battery 9 | Separator 9 | 1688 | 87.9% | 0.521 |
| Battery 10 | Separator 10 | 1676 | 89.5% | 0.129 |
| Battery 11 | Separator 11 | 1679 | 90.2% | 0.137 |
| Battery 12 | Separator 12 | 1688 | 90.7% | 0.142 |
| Battery 13 | Separator 13 | 1623 | 90.2% | 0.138 |
| Battery 14 | Separator 14 | 1608 | 90.1% | 0.149 |
| Battery 15 | Separator 15 | 1622 | 90.8% | 0.120 |
| Battery 16 | Separator 16 | 1668 | 91.2% | 0.121 |
| Battery 17 | Separator 17 | 1603 | 90.9% | 0.130 |
| Battery 18 | Separator 18 | 1618 | 91.0% | 0.146 |
| Battery 19 | Separator 19 | 1601 | 91.2% | 0.145 |
| Battery 20 | Separator 20 | 1604 | 90.5% | 0.155 |
| Battery 21 | Separator 21 | 1651 | 91.1% | 0.140 |
| Battery 22 | Separator 22 | 1698 | 90.2% | 0.120 |
| Battery 23 | Separator 23 | 1623 | 90.4% | 0.121 |
| Battery 24 | Separator 24 | 1662 | 90.4% | 0.123 |
| Battery 25 | Separator 25 | 1661 | 90.9% | 0.141 |
| Battery 26 | Separator 26 | 1619 | 90.6% | 0.125 |
| Battery D1 | Separator D1 | 1642 | 84.5% | 0.429 |
| Battery D2 | Separator D2 | 1642 | 81.2% | 0.512 |

It can be seen from the above experimental results that the separator without a porous inorganic layer has a significantly poorer thermal shrinkage and wettability than the separator according to the embodiments of the present disclosure. At the same time, the cycling performance and high temperature storage performance of the lithium-ion secondary battery prepared by using the separator are also significantly lower than those of the separator according to the embodiment of the present disclosure. Although the separator provided with the porous inorganic layer has similar thermal shrinkage property and air permeability as the separator provided with the inorganic layer/organic particle coating composite layer, the battery adopting the separator only with the porous inorganic layer may internally expand during the cycling process, so that a displacement may occur at the interface between the electrode plate and the separator, resulting in a relatively poor cycle performance.

In addition, the battery capacity of the lithium ion secondary battery using the separator according to the present disclosure does not change significantly.

The above embodiments of the present disclosure are only preferable embodiments, but not intended to limit the present disclosure. Without departing from spirit and principles of the present disclosure, any modifications, equivalent substitutions, improvements and the like shall be included in the protection scope of the disclosure.

What is claimed is:

1. A separator comprising a porous substrate, wherein the porous substrate has two opposite surfaces,
a composite layer is provided on only one or both of the two opposite surfaces of the porous substrate, the composite layer comprising a porous inorganic layer and an organic particle coating layer sequentially disposed on the surface of the porous substrate,
wherein when the composite layer is provided on only one of the two opposite surfaces of the porous substrate, the porous inorganic layer or the organic particle coating layer is selectively further provided on the other one of the two opposite surfaces of the porous substrate,
wherein the porous inorganic layer comprises an inorganic dielectric material containing no binder, and the organic particle coating layer is an island-like or sheet-like coating discontinuously distributed on a surface of the porous inorganic layer and formed by mixing organic particles and a solvent to obtain an organic mixture, preparing the organic mixture on the porous inorganic layer, and drying the organic mixture, and
wherein mass per unit area of the composite layer is 0.2 g/m² to 8.4 g/m².

2. The separator according to claim 1, wherein the porous inorganic layer has a thickness of 20 nm to 2000 nm.

3. The separator according to claim 1, wherein the organic particle coating layer has a thickness of 1 μm to 6 μm.

4. The separator according to claim 1, wherein the porous inorganic layer has a porosity of 10% to 60%.

5. The separator according to claim 1, wherein the porous inorganic layer has pores for ion transmission, and the pores have an average pore diameter of 0.1 nm to 20 nm.

6. The separator according to claim 1, wherein organic particles in the organic particle coating layer have an average particle size of 100 nm to 300 nm.

7. The separator according to claim 1, wherein organic particles in the organic particle coating layer are made of materials comprising a viscous organic material.

8. The separator according to claim 1, wherein a mass percentage of the organic particle coating layer is 1 wt % to 60 wt % with respect to a total mass of the composite layer, and a coating area percentage of the organic particle coating layer is 50% to 80% with respect to a total area of the composite layer.

9. The separator according to claim 1, wherein the porous inorganic layer comprises $AlO_x$, $1.45 \leq x \leq 1.55$.

10. The separator according to claim 1, wherein a mass percentage of the $AlO_x$ in the porous inorganic layer is 50% to 100%.

11. The separator according to claim 1, wherein the porous inorganic layer uniformly disposed on one surface of the porous substrate and at least a part of inner walls of pores on the surface.

12. The separator according to claim 1, wherein an interfacial peeling force between the porous inorganic layer and the porous substrate is larger than or equal to 30 N/m.

13. The separator according to claim 1, wherein the porous inorganic layer is prepared by vapor deposition method.

14. The separator according to claim 1, wherein a material of the porous substrate is selected from a group consisting of polyethylene, polypropylene, polyvinylidene fluoride, aramid fiber, polyethylene glycol terephthalate, polytetrafluoroethylene, polyacrylonitrile, polyimide, polyamide, polyester, natural fiber, or combinations thereof.

15. The separator according to claim 1, wherein after the separator is placed at 90° C. for one hour, shrinkage percentages of the separator in a transverse direction and a longitudinal direction are lower than 2%.

16. A method for preparing the separator according to claim 1, comprising at least following steps:
preparing a porous inorganic layer on at least one surface of a porous substrate by using vapor deposition method;
mixing organic particles and a solvent to obtain an organic mixture, preparing the organic mixture on the porous inorganic layer, and drying the organic mixture to form the organic particle coating layer.

17. The method according to claim 16, wherein the vapor deposition method comprises atomic layer deposition, chemical vapor deposition, physical vapor deposition, or thermal evaporation deposition.

18. The method according to claim 16, wherein preparing the organic mixture on the porous inorganic layer comprises at least one of intaglio printing process, extrusion coating method, or spray coating method.

19. An electrochemical device, comprising the separator according to claim 1.

* * * * *